United States Patent
Sisson et al.

[11] 3,893,345
[45] July 8, 1975

[54] TRANSMISSIONS

[75] Inventors: Ronald L. Sisson; Philip J. Dreves; James E. Shellberg, all of Jackson; Burton S. Zeller, Parma, all of Mich.

[73] Assignee: Clark Equipment Company, Buchanan, Mich.

[22] Filed: Sept. 9, 1974

[21] Appl. No.: 504,576

Related U.S. Application Data

[63] Continuation of Ser. No. 392,140, Aug. 27, 1973, abandoned.

[52] U.S. Cl. .................. 74/331; 74/15.66; 74/359; 74/360; 74/745
[51] Int. Cl. .............................................. F16h 3/08
[58] Field of Search ............ 74/329, 331, 359, 360, 74/357, 745, 15.84, 15.63; 75/15.66

[56] References Cited
UNITED STATES PATENTS

| | | | |
|---|---|---|---|
| 838,259 | 12/1906 | Manross | 74/359 |
| 2,115,390 | 4/1938 | Lasley et al. | 74/745 X |
| 2,241,764 | 5/1941 | Bollinger et al. | 74/745 |

FOREIGN PATENTS OR APPLICATIONS

| | | | |
|---|---|---|---|
| 717,450 | 10/1954 | United Kingdom | 74/359 |

*Primary Examiner*—Samuel Scott
*Assistant Examiner*—John Reep
*Attorney, Agent, or Firm*—Ernst H. Ruf

[57] ABSTRACT

A family of multispeed constant-mesh-gear reversible transmissions has a basic structure that includes at least five drivingly connected shafts, with all of these shafts lying in a common plane. A plurality of gear trains selectively drives the output shaft at various speed ratios, and pluralities of clutches are used for connecting several of the shafts and for connecting various ones of the gears to various shafts for conjoint rotation therewith. Numerous embodiments of connecting means are used for connecting the output shaft with at least one of the several gears.

24 Claims, 9 Drawing Figures

PATENTED JUL 8 1975　　3,893,345

SHEET 3

TRANSMISSIONS

This is a continuation of application Ser. No. 392,140, filed Aug. 27, 1973, now abandoned.

BACKGROUND OF THE INVENTION

The field of art to which this invention pertains includes power transmission mechanisms and more specifically such mechanisms as have multiple forward and reverse constant-mesh gearing.

In multiple-speed gear transmissions, it is desirable to arrange the transmissions' major components, or basic structure, in such a way that a variety of additional components or modifications may easily be added to this basic mechanism or structure. Transmissions of this general type are mainly utilized in off-highway heavy duty vehicles and construction equipment which often are manufactured for specific requirements in only limited numbers. Thus, having a basic transmission structure which can readily be adapted to meet unique criteria is of paramont importance. Not only is cost reduced but dependability is improved.

This invention sets forth a whole family of transmissions that starts with the basic structure that is then modified to meet particular requirements of both installation and performance.

The family of transmissions of this invention has a common denominator in the fact that regardless of the number of shafts utilized, they always lie in a common plane, preferably vertical. This allows the production of a family of constant-width transmissions, which not only greatly facilitates installation procedures but also permits the use of large numbers of common parts. These transmissions include embodiments wherein the input shaft is axially aligned with the output shaft, i.e., an in-line transmission and a series of transmissions wherein the output shaft is parallel but vertically displaced from the input shaft. Transmissions of this type are generally designated "drop" transmissions and may include short-drop, intermediate-drop and long-drop versions, wherein the output shaft is progressively further vertically displaced from the input shaft. In addition, several of the transmissions may be equipped with power takeoff shafts as well as front and rear-directed output shafts.

SUMMARY OF THE INVENTION

In carrying out this invention in several preferred embodiments thereof, all of these embodiments have a common basic structure which provides a transmission having an input shaft, a first shaft lying in a common plane with the input shaft, a second shaft axially aligned with the input shaft, a third shaft axially aligned with one of the first and second shafts, and an output shaft, with all of these shafts lying in a common plane. A first gear is fixed to the input shaft and drivingly connected with a second gear journaled for rotation on the first shaft. A first clutch means connects the input shaft with the second shaft, and a second clutch means connects the second gear to the first shaft for conjoint rotation therewith. A third gear is fixed to the second shaft and in mesh with a fourth gear fixed to the first shaft. A third clutch means connects the third shaft with one of the first and second shafts, while a fourth clutch means connects a fifth gear, journaled for rotation on the third shaft, to the third shaft. In addition, a sixth gear is fixed to the third shaft, and there are means for drivingly connecting the output shaft with at least the sixth gear.

One embodiment of this driving means may include a fourth shaft in the same plane as the other shafts, with a fifth clutch means connecting this fourth shaft to a fifth shaft axially aligned with the fourth shaft. Seventh and eighth gears, fixed to the fourth shaft, are in mesh with the fourth and fifth gears, respectively. A ninth gear, fixed to the fifth shaft, is in mesh with the sixth gear, and a tenth gear, fixed to the output shaft, is in mesh with the ninth gear.

Another embodiment of the connecting means may include a fourth shaft in a common plane with the other shafts and a fifth shaft axially aligned with the fourth shaft. Seventh and eighth gears, fixed to the fourth shaft, are in mesh with the fourth and fifth gears, respectively. Tenth and twelfth gears are journaled for rotation on the output shaft and in mesh with eleventh and thirteenth gears, fixed to the fifth shaft, respectively. A ninth gear is fixed to the fifth shaft and in mesh with the sixth gear. Means are provided for alternately connecting the tenth and twelfth gears to the output shaft for conjoint rotation therewith.

A further embodiment of the connecting means includes a fourth shaft lying in a common plane with the other shafts and having affixed thereto seventh and eighth gears that are in mesh with the fourth and fifth gears, respectively. A fifth clutch means connects the fourth shaft to the output shaft, with the output shaft having a ninth gear fixed thereon, and in mesh with the sixth gear.

In another modification, the basic transmission structure includes a seventh gear fixed to the second shaft and in mesh with the fifth gear. The connecting means of this modification includes a fourth shaft lying in the same plane as the other shafts with a ninth gear, fixed to the fourth shaft, being in mesh with both the sixth gear and a tenth gear fixed to the output shaft. An eighth gear is journaled for rotation on the fourth shaft and is in mesh with the fifth gear, with a fifth clutch means connecting the eighth gear to the fourth shaft for conjoint rotation therewith.

In yet a further modification of the transmission of this invention, the basic transmission structure again includes a seventh gear fixed to the second shaft and in mesh with fifth gear. The connecting means of this embodiment includes a ninth gear fixed to the output shaft and in mesh with the sixth gear and an eighth gear journaled for rotation on the output shaft and in mesh with the fifth gear. A fifth clutch means connects the eighth gear to the output shaft.

Still another modification of the transmission of this invention has a connecting means which includes a seventh gear fixed to the output shaft and in mesh with the sixth gear. An eighth gear is fixed to the second shaft and in mesh with the fifth gear, with a fifth clutch means connecting the second shaft to the output shaft for conjoint rotation therewith.

In an additional embodiment of this invention, the connecting means includes a seventh gear fixed to the output shaft and in mesh with the sixth gear. An eighth gear is fixed to the first shaft and in mesh with the fifth gear, with a fifth clutch means connecting the first shaft to the output shaft for conjoint rotation therewith.

If desired, the basic transmission structure may further include an auxiliary power takeoff shaft that is concentric with the second shaft and connected to the input shaft for conjoint rotation therewith. Furthermore, at least one of the output shaft gears may be journaled for rotation on the output shaft and selectively connected or disconnected with respect to the output shaft, so as to permit towing of the vehicle, equipped with one of these transmissions, without rotating any of the transmission components except for the output shaft.

The principal objects, features and advantages of this invention will be more readily understood by persons skilled in the art when following the detailed description in conjunction with the drawings.

DESCRIPTION OF THE PREFERRED EMBODIMENTS

Figure 1:
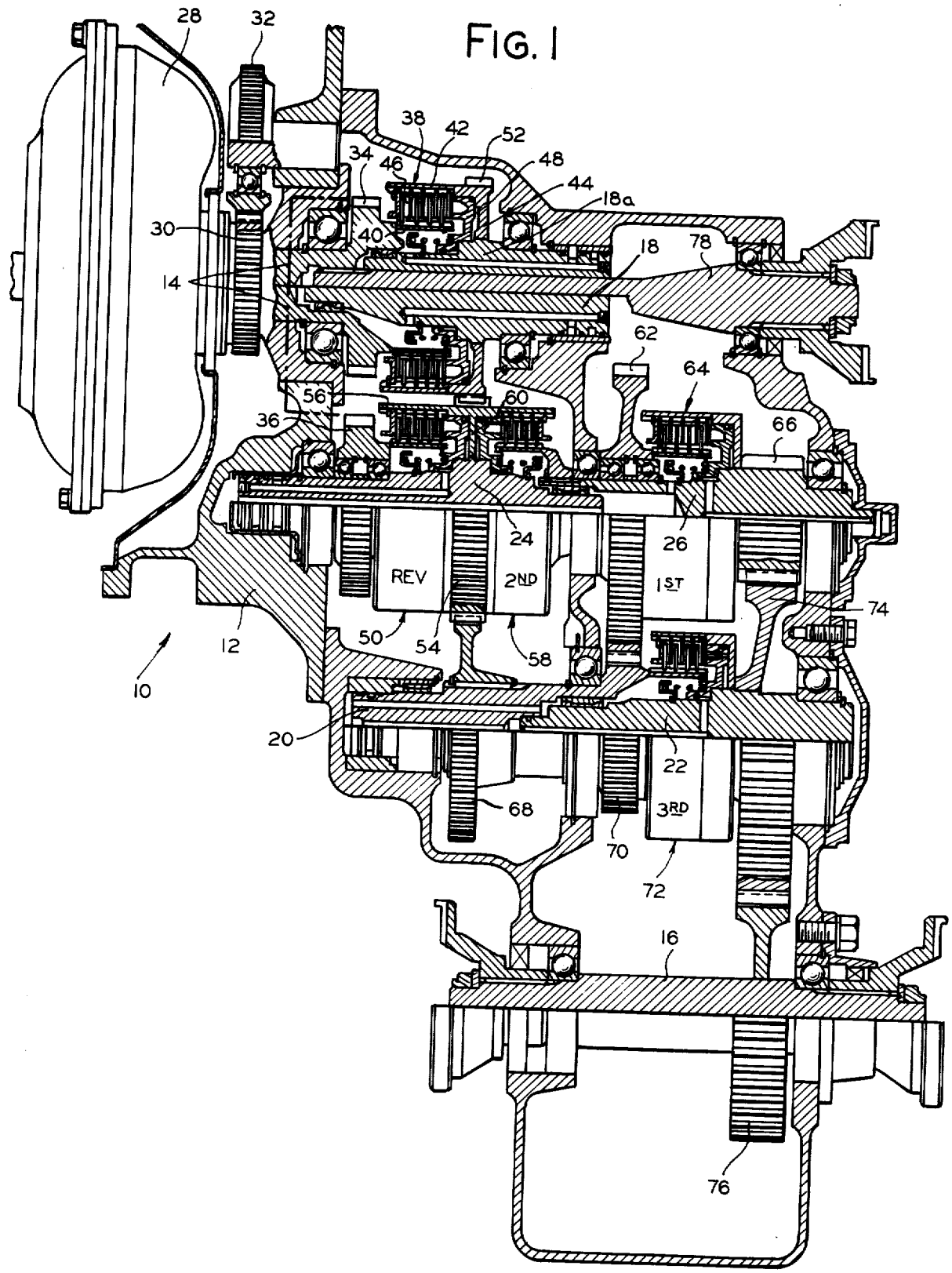
FIG. 1 is a longitudinal view, partially in section, of a three speed long-drop version of the transmissions embodying this invention.
Figure 2:
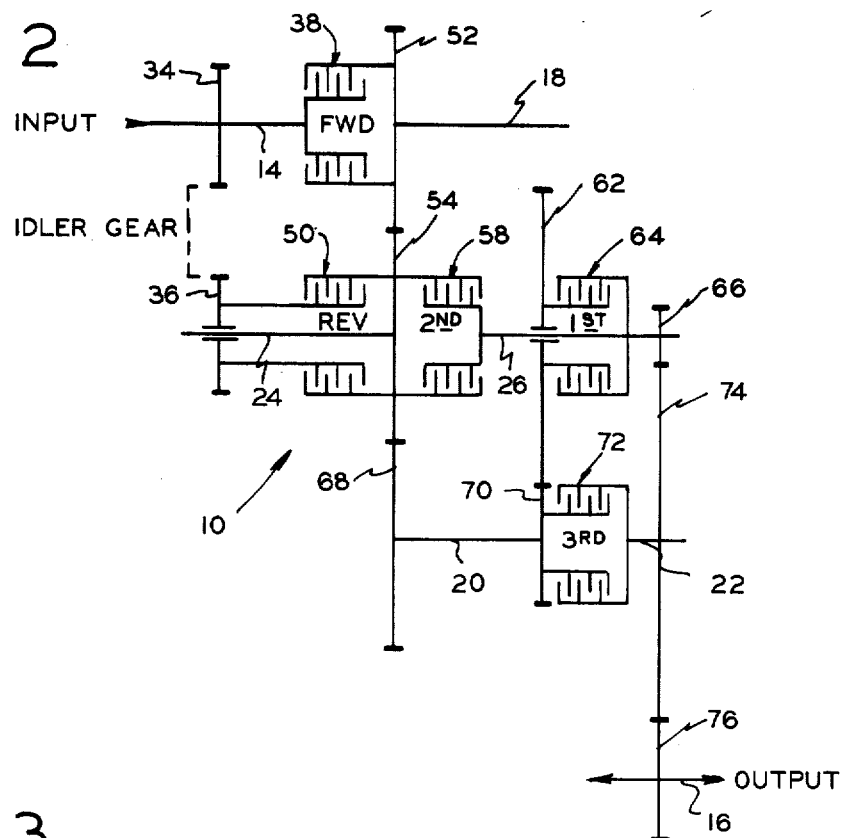
FIG. 2 is a simplified schematic representation of the transmission shown in FIG. 1.

Referring now to FIGS. 1 and 2, the reference numeral 10 generally denotes a transmission of the constant-mesh-gear type, having a housing 12 in which an input shaft 14, output shaft 16 and shafts 18, 20, 22, 24 and 26 are journalled for rotation.

Input shaft 14 is driven by means of a hydrodynamic torque converter 28 of known construction to which shaft 14 is connected, with torque converter 28 being in turn connected to any suitable source of power, such as an internal combustion engine (not shown). In addition, the torque converter impeller drives one or more pumps (not shown) on housing 12, at engine speed, through at least one pair of meshing gears 30 and 32 which are connected respectively to the impeller and the drive shaft of each of the pumps. One of the pumps, which are of well known construction, serves to provide pressurized fluid to operate the various fluid actuated clutches, as well as lubricate the gears and bearings associated with transmission 10.

Connected to input shaft 14 is an input gear 34 which is drivingly connected by means of an idler gear (not shown) with a gear 36, with gear 36 being mounted and capable of being rotated with respect to on shaft 24. Input shaft 14 can be connected to shaft 18 for conjoint rotation therewith by means of a clutch 38. Clutch 38, which is a multiple plate, fluid-actuated-type clutch of well known construction, includes a hub 40 connected to gear 34 by any suitable means, such as welding; a drum 42 which has a web 44 integral therewith, with web 44 being fixed to shaft 18 by any suitable means, such as welding; and a plurality of interleaved friction plates 46 splined alternately to hub 40 and drum 42. Clutch 38 is engaged by supplying pressurized fluid behind a piston 48 which serves to press plates 46 together so that hub 40 is frictionally connected to drum 42 through plates 46.

Gear 36 can be connected to shaft or countershaft 24 for conjoint rotation therewith by means of a fluid actuated multiple plate clutch 50 which is substantially similar to clutch 38, and so will not be described further.

At this time, it will be noted that a gear 52 is integral with drum 42 of clutch 38 and meshes with another gear 54, which is integral with drum 56 of clutch 50. It should be clear at this time that shaft 18 is axially aligned with input shaft 14 and that shaft 24 is vertically aligned or in the same vertical plane as input shaft 14. Shaft 18 and shaft 24 are interconnected by means of meshing gears 52 and 54 so that for any given direction of rotation of one of these shafts, the other shaft will rotate in the opposite direction. In addition, since gear 34 is drivingly connected, via an idler gear, with gear 36, they, therefore, rotate in the same direction. Thus, engagement of clutch 38 conditions transmission 10 for what may be arbitrarily designated "forward drive" and engagement of clutch 50 conditions the transmission for what may again be arbitrarily termed "reverse drive," depending, of course, on the direction of rotation of input shaft 14.

Shaft or countershaft 26, which is axially aligned with shaft or countershaft 24, can be connected to shaft 24 for conjoint rotation therewith by engagement of another multiple plate fluid-actuated-type clutch 58, with clutch 58 being allochiral to clutch 50 and sharing a common web 60 therewith. A gear 62 is journaled for rotation on countershaft 26 and can be connected thereto for conjoint rotation therewith by means of a clutch 64 which again is substantially similar to previously described clutch 38. In addition, a gear 66 is fixed to countershaft 26 for conjoint rotation therewith.

Shaft 20, which is rotatably journalled below shaft 24 and is thusly also vertically aligned or in the same vertical plane as input shaft 14, has fixedly secured thereto a gear 68 and a gear 70 for conjoint rotation therewith, with gear 68 meshing with gear 54 and gear 70 meshing with gear 62. Shaft 22 can be connected to shaft 20 for conjoint rotation therewith by engagement of a clutch 72, with clutch 72 again being substantially similar to previously described clutch 38. A gear 74 is fixed to shaft 22 and is in constant mesh with gear 66.

Output shaft 16, which is also vertically aligned or in the same vertical plane as input shaft 14, has a gear 76 fixed thereto for conjoint rotation therewith, with gear 76 being in constant mesh with gear 74.

While output shaft 16 is shown in FIG. 1 as extending from both the rear and the front of transmission housing 12, it should be understood that, if desired, it could extend on only one side of the housing, and that its opposite end could be provided with a co-axial auxiliary output shaft (not shown) that could be selectively engageable with output shaft 16 by means of a conventional sliding tooth clutch (not shown). In addition, a power takeoff shaft 78 (FIG. 1 only) that is driven at torque converter output speed can be utilized in combination with a concentric, hollow shaft 18a (FIG. 1 only) instead of shaft 18, with shaft 78 being co-axial with and splined to input shaft 14. Furthermore, if desired, output shaft gear 76 could be rotatably journaled on output shaft 16 so that it could be selectively engageable therewith by means of, for example, a conventional sliding tooth clutch (not shown). Disconnecting gear 76 from shaft 16 permits towing of a vehicle equipped with transmission 10 without rotating any other transmission components besides output shaft 16.

In view of the foregoing description, it will be apparent, since all of the gears are in constant mesh, that a first forward speed ratio is provided by the engagement of clutches 38 and 64 so that output shaft 16 is driven through the gear train comprising gears 52, 54, 68, 70, 62, 66, 74 and 76. A second higher speed ratio is provided by continued engagement of clutch 38 and the engagement of clutch 58 (instead of clutch 64) so that output shaft 16 is driven through a gear train comprising gears 52, 54, 66, 74 and 76. A third, or high speed, ratio is provided by the continued engagement of clutch 38 and the engagement of clutch 72 (instead of clutch 58) so that output shaft 16 is driven through a gear train comprising gears 52, 54, 68, 74 and 76. By engaging clutch 50 and clutch 64, a low reverse speed ratio is provided through gears 34, 36, 54, 68, 70, 62, 66, 74 and 76. By releasing clutch 64 and engaging clutch 58, a second or intermediate reverse speed ratio is provided through gears 34, 36, 66, 74 and 76. A third, or high, reverse speed ratio is provided through gears 34, 36, 54, 68, 74 and 76 by engaging clutches 50 and 72.

It should be noted that in this transmission, input shaft 14 and output shaft 16 are parallel and lie in a common vertical plane, with all of the other shafts also lying in the same vertical plane. In addition, input shaft 14 and shaft 18 are axially aligned, shafts 24 and 26 are axially aligned and shafts 20 and 22 are axially aligned. The utilization of this arrangement allows the production of a compact, space-saving transmission that is also easy to manufacture.

DESCRIPTION OF THE FIG. 3 MODIFICATION

Figure 3:
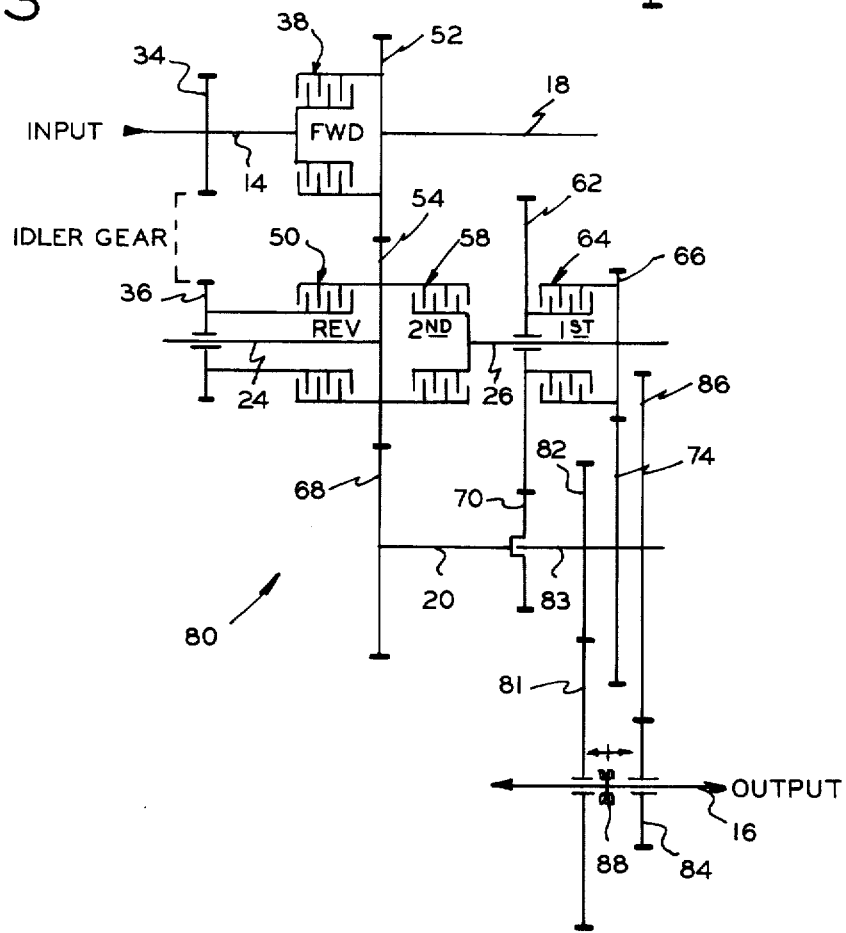
FIG. 3 is a schematic representation of a two speed with mechanical range version of the transmission shown in FIG. 1.

Referring now to FIG. 3, there is shown a modification of this invention which provides two speed ratios in both the forward and reverse direction, in both a high and a low range. Thus, transmission 80 is capable of providing four forward and reverse speeds, but a shift is required between the first and second ranges. To the extent that this embodiment is the same as previously described transmission 10 in FIGS. 1 and 2, reference is made here to this preceding description, with like reference numerals being applied to like parts. A comparison of FIGS. 2 and 3 will show that in transmission 80 (FIG. 3) clutch 72 is not utilized for selectively connecting shaft 20 to a shaft 83 that is axially aligned therewith. In addition, a gear 81 is not affixed to, but is journaled for rotation on, output shaft 16. A gear 82 is fixed to shaft 83 and is in constant mesh with gear 81. Another gear 84 is also journaled for rotation on output shaft 16 and is in constant mesh with a further gear 86 that in turn is fixed to shaft 83. Output shaft 16 also has secured thereto connecting means 88 for alternately connecting gears 81 and 84 to output shaft 16 for conjoint rotation therewith. Connecting means 88 may, for example, be a conventional sliding tooth clutch which can be shifted in any desired manner to axially couple either gear 81 or gear 84 to the output shaft.

By engaging clutch 38, the transmission is conditioned for forward drive, but by disengaging clutch 38, and by engaging clutch 50, the transmission is conditioned for reverse drive. At this point it will be seen, since all of the gears are in constant mesh, that a first speed ratio is provided, in both forward and reverse, by engaging clutch 64 so that shaft 83 is driven through the gear trains comprising either gears 52, 54, 68, 70, 62, 66 and 74 or 34, 36, 54, 68, 70, 62, 66 and 74. A second speed ratio is provided, in both forward and reverse, by engaging clutch 58 so that shaft 83 is driven through the gear trains comprising either gears 52, 54, 66 and 74 or 34, 36, 66 and 74. It will also be seen that shaft 83 drives output shaft 16 either through the gear train comprising gears 82 and 81 when connecting means 88 is axially shifted to connect gear 81 to output shaft 16 for conjoint rotation therewith. or through the gear train comprising gears 86 and 84 when connecting means 88 is shifted to connect gear 84 for conjoint rotation with output shaft 16. The connection of gear 81 with output shaft 16 provides first, or low, range drive, whereas connection of gear 84 with output shaft 16 provides for a second, or high, range drive. It should be clear that both first and second speed ratios, via clutches 64 and 58, respectively, can be provided in both the high and low range previously described. Thus, the operator has two speeds forward or reverse in each of the two drive ranges, with a shift of connecting means 88 being required to select either of the two ranges.

It should be clear that connecting means 88 can be shifted to a neutral position, i.e., in which neither of gears 81 and 84 is coupled to output shaft 16. This neutral position permits towing of a vehicle equipped with transmission 80 without rotating any other transmission components besides output shaft 16.

DESCRIPTION OF THE FIG. 4 MODIFICATION

Figure 4:
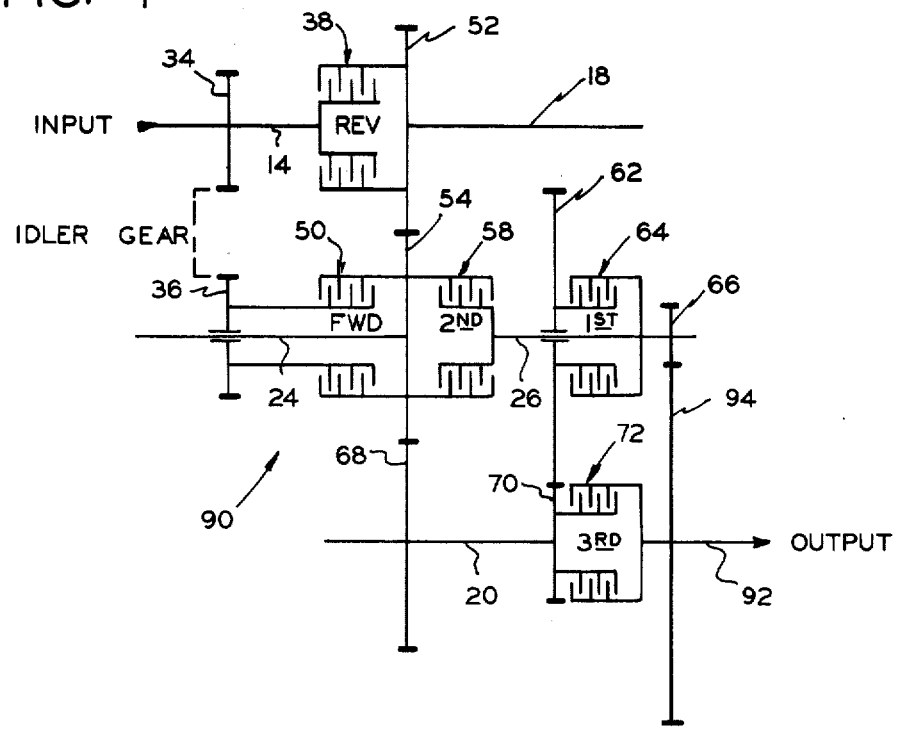
FIG. 4 is a schematic representation of a three speed intermediate-drop version of the transmission shown in FIG. 1.

Referring now to FIG. 4, there is shown a schematic representation of a three speed intermediate-drop version 90 of the transmission shown in FIGS. 1 and 2, with transmission 90 also providing three speed ratios in both the forward and reverse direction. To the extent that this embodiment is the same as previously described transmission 10 (FIGS. 1 and 2), reference is made here to this preceding description, with like numerals being applied to like parts. In transmission 90 in FIG. 4, the separate fourth vertical level output shaft 16 and affixed gear 75 of FIGS. 1 and 2 have been deleted; thus, shaft 22 (FIGS. 1 and 2) becomes output shaft 92 in FIG. 4. Another gear 94 is fixed to output shaft 92 and is in constant mesh with gear 66.

In order to maintain the same arbitrarily designated "forward" and "reverse" rotation of output shaft 92, clutch 38 is now designated as "reverse" and clutch 50 is now designated as "forward."

It will be seen at this point that a first speed ratio is provided, in both forward and reverse, by engaging clutch 64 so that output shaft 92 is driven through the gear trains comprising either gears 34, 36, 54, 68, 70, 62, 66 and 94 or 52, 54, 68, 80, 62, 66 and 94. Second speed ratio is provided, in both forward and reverse, by engaging clutch 58 so that output shaft 92 is driven through the gear trains comprising either gears 34, 36, 66 and 94 or 52, 54, 66 and 94. A third speed ratio is provided, in both forward and reverse, by engaging clutch 72 so that output shaft 92 is driven through the gear trains comprising either gears 34, 36, 54 and 68 or 52,54 and 68.

DESCRIPTION OF THE FIG. 5 MODIFICATION

Figure 5:
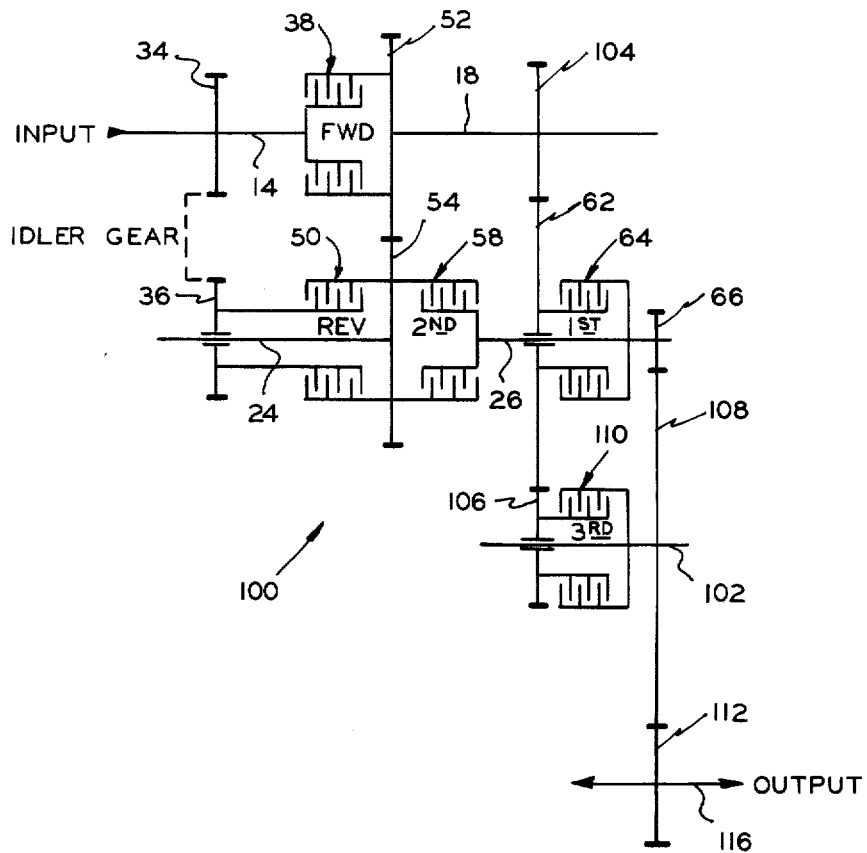
FIG. 5 is a schematic representation of an alternate embodiment of the three speed long-drop transmission shown in FIG. 1.

Referring now to FIG. 5, there is shown a schematic representation of an alternate embodiment of the three speed long-drop transmission 10 shown in FIGS. 1 and 2. To the extent that this embodiment is the same as previously described transmission 10 (FIGS. 1 and 2), reference is made here to this preceding description, with like numerals being applied to like parts.

In transmission 100 in FIG. 5, the separate shaft 20 and affixed gear 68 of FIGS. 1 and 2 have been deleted; thus, shaft 22 (FIGS. 1 and 2) becomes shaft 102 in FIG. 5. In transmission 100, a gear 104 is fixedly secured on shaft 18, with gear 104 meshing with gear 62. Shaft 102, which is rotatably journalled below countershaft 26 and is thusly also vertically aligned or in the same vertical plane as input shaft 14, has another gear 106 journaled for rotation on shaft 102 and can be connected thereto for conjoint rotation therewith by means of a clutch 110 which is again substantially similar to previously described clutch 38. In addition, a gear 108 is fixed to shaft 102 for conjoint rotation therewith, with gear 108 meshing with gear 66 and gear 112 affixed to output shaft 116.

By engaging clutch 38, the transmission is conditioned for forward drive; by disengaging clutch 38, and by engaging clutch 50, the transmission is conditioned for reverse drive. At this point it will be seen, since all of the gears are in constant mesh, that a first speed ratio is provided, in both forward and reverse, by engaging clutch 64 so that output shaft 116 is driven through the gear trains comprising either gears 104, 62,66, 108 and 112 or 34, 36, 54, 52, 104, 62, 108 and 112. A second speed ratio is provided, in both forward and reverse, by engaging clutch 58 so that output shaft 116 is driven through the gear trains comprising either gears 52, 54, 66, 108 and 112 or 34, 36, 66, 108 and 112. A third speed ratio is provided, in both forward and reverse, by engaging clutch 110 so that output shaft 116 is driven through gear trains comprising either gears 104, 62, 106, 108 and 112 or 34, 36, 54, 52, 104, 62, 106, 108 and 112.

In view of the foregoing description, it will be apparent that a first forward speed ratio is provided by the engagement of clutches 38 and 64, a second higher speed ratio is provided by continued engagement of clutch 38 and the engagement of clutch 58 instead of clutch 64, and a third speed ratio is provided by the continued engagement of clutch 38 and the engagement of clutch 110 instead of clutch 58. By engaging clutches 50 and 64, a low reverse speed ratio is provided, and by releasing clutch 64 and engaging clutch 58, a second reverse speed ratio is provided, with a third reverse speed ratio being provided by the engagement of clutches 50 and 110.

It should be noted that in transmission 100, as in the previously described transmissions, the input and output shafts are parallel and lie in a common vertical plane, with all of the shafts also lying in the same vertical plane. In addition, transmission 100, by mounting gear 104 on shaft 18, utilizes one less shaft than transmission 10 shown in FIGS. 1 and 2.

DESCRIPTION OF THE FIG. 6 MODIFICATION

Figure 6:
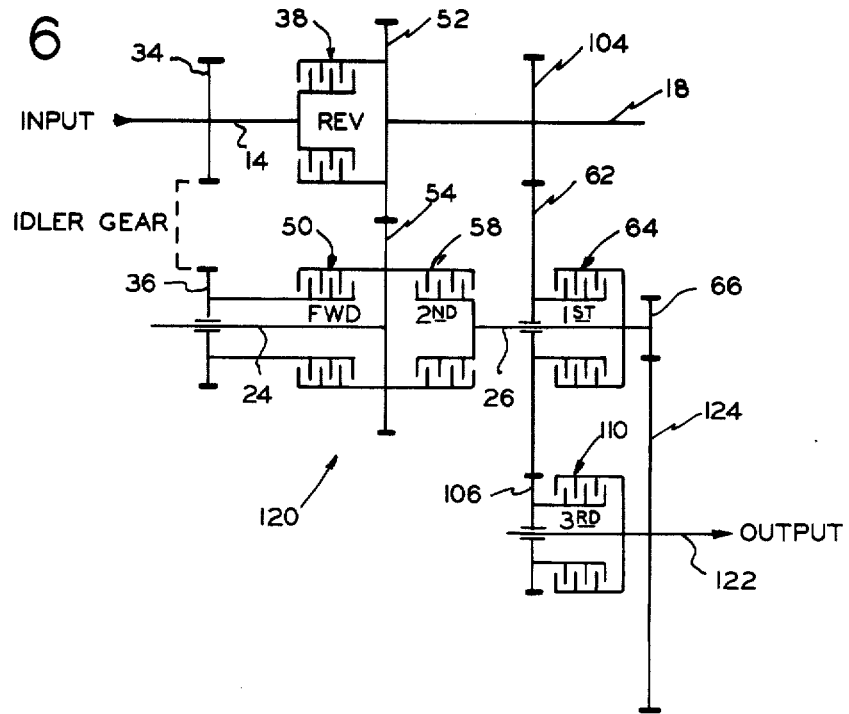
FIG. 6 is a schematic representation of a three speed intermediate-drop version of the transmission shown in FIG. 5.

Referring now to FIG. 6, there is shown a schematic representation of a three speed intermediate-drop version 120 of the transmission shown in FIG. 5, with transmission 120 also providing three ratios in both the forward and reverse direction. To the extent that this embodiment is the same as previously described transmission 10 (FIGS. 1 and 2) and transmission 100 (FIG. 5), reference is made here to these preceding descriptions with like numerals again being applied to like parts. In transmission 120 in FIG. 6, the separate fourth vertical level output shaft 116 and affixed gear 112 of FIG. 5 have been deleted; thus, shaft 102 (FIG. 5) becomes output shaft 122 in FIG. 6. A gear 124 is affixed to output shaft 122 and is in constant mesh with gear 66.

In order to maintain the same arbitrarily designated "forward" and "reverse" rotation of output shaft 122, clutch 38 is now designated as "reverse" and clutch 50 is now designated as "forward."

It will be seen at this point that a first speed ratio is provided, in both forward and reverse, by engaging clutch 64 so that output shaft 122 is driven through the gear trains comprising either gears 34, 36, 54,52, 104, 62, 66 and 124 or 104; 62, 66 and 124. Second speed ratio is provided, in both forward and reverse, by engaging clutch 58 so that output shaft 122 is driven through the gear trains comprising either gears 34, 36, 66 and 124 or 52, 54, 66 and 124. A third speed ratio is provided, in both forward and reverse, by engaging clutch 110 so that output shaft 122 is driven by gear trains comprising either gears 34, 36, 54, 52, 104, 62 and 106 or 104, 62 and 106.

DESCRIPTION OF THE FIGS. 7 AND 8 EMBODIMENT

Figure 8:
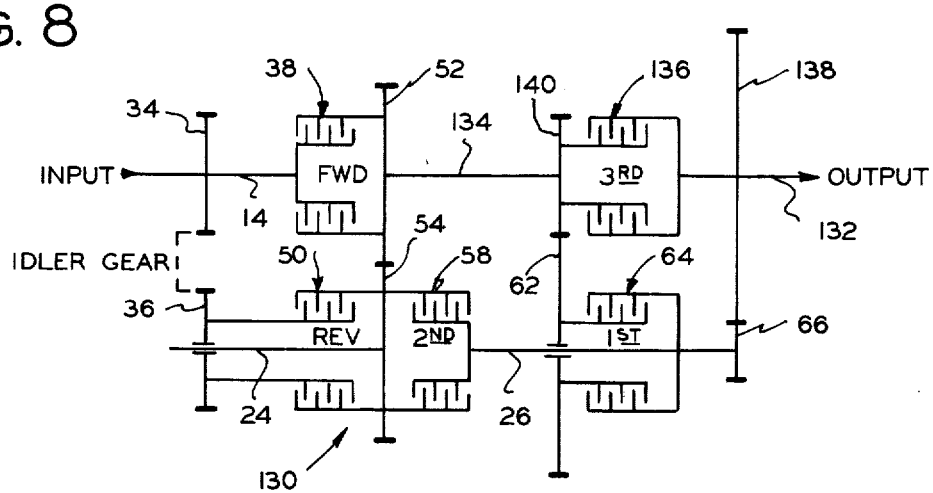
FIG. 8 is a simplified schematic representation of the transmission shown in FIG. 7.
Figure 7:
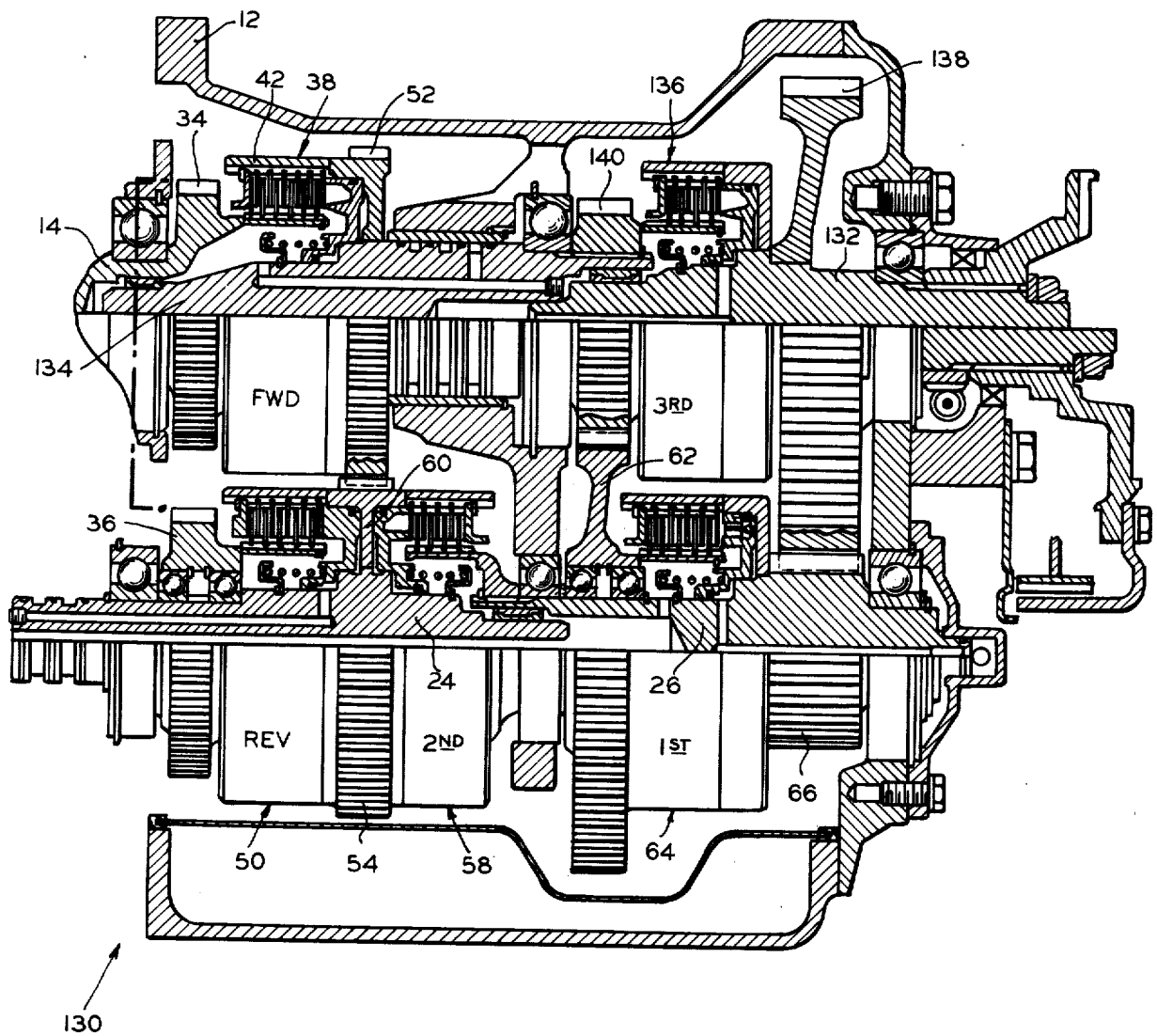
FIG. 7 is a longitudinal sectional view of an in-line three speed version of the transmissions of this invention.

Referring now to FIGS. 7 and 8, there is shown another embodiment of this invention, with the reference numeral 130 generally denoting a transmission of the constant-gear-mesh type. FIG. 7 is a longitudinal sectional view of an in-line three speed embodiment of the transmissions of this invention. From FIG. 8, which is a simplified schematic representation of transmission 130 shown in FIG. 7, it may readily be ascertained that the input and output shafts are axially aligned. To the extent that transmission 130 is the same as previously described transmission 10 in FIGS. 1 and 2, reference is made here to this preceding description, with like reference numerals being applied to like parts.

Similar to transmission 10, transmission 130 has a housing 12 in which an input shaft 14, output shaft 132, as well as shafts 24, 26 and 134, are journalled for rotation. Input shaft 14 is driven by means of a hydrodynamic torque converter (not shown) of known construction to which input shaft 14 is connected, with the torque converter in turn being connected to any suitable source of power, such as an internal combustion engine (not shown). The torque converter impeller again drives one or more hydraulic pumps (not shown) of well known construction, at least one of which serves to provide pressurized fluid to operate the fluid actuated clutches, as well as lubricate the gears and bearings associated with transmission 130.

Connected to input shaft 14 is a gear 34 which is drivingly connected by means of an idler gear (not shown) with a gear 36, with gear 36 being journaled for rotation on shaft or countershaft 24. Shaft 134, which is axially aligned with input shaft 14, can be connected thereto for conjoint rotation therewith by means of a clutch 38 (previously described with reference to FIGS. 1 and 2).

Gear 36 can be connected to countershaft 24 for conjoint rotation therewith by means of clutch 50, with shaft or countershaft 26, which is axially aligned with countershaft 24, being connectable to countershaft 24 for conjoint rotation therewith by engagement of a clutch 58. Clutches 50 and 58 are the two halves of the double clutch and are joined by common web 60 which is affixed to countershaft 24 by any suitable means, such as welding.

At this time, it will be noted that a gear 52 is integral with drum 42 of clutch 38 and meshes with another gear 54 which is integral with the common drum of clutches 50 and 58. It should also be clear at this time that countershafts 24 and 26 are vertically aligned or in the same vertical plane as input shaft 14 and shaft 134. Shaft 134 and countershaft 24 are interconnected by means of meshing gears 52 and 54 so that for any given direction of rotation of one of these shafts, the other shaft will rotate in the opposite direction. In addition, since gear 34 is drivingly connected, via an idler gear, with gear 36, they, therefore, rotate in the same direction. Thus, engagement of clutch 38 conditions transmission 130 for what may be arbitrarily designated "forward drive," and engagement of clutch 50 conditions the transmission for what may again arbitrarily be termed "reverse drive" depending, of course, on the direction of rotation of input shaft 14.

A gear 140 is fixed to shaft 134 and can be connected to output shaft 132, which is axially aligned with shaft 134, by means of a clutch 136 which is substantially similar to clutch 38, and so will not be described further.

A gear 62 is journaled for rotation on countershaft 26 and can be connected thereto for conjoint rotation therewith by means of clutch 64, with gear 62 being in constant mesh with gear 140. In addition, a gear 66 is fixed to countershaft 26 for conjoint rotation therewith, with gear 66 being in constant mesh with a gear 138 affixed to output shaft 132.

At this point, it will be seen, since all of the gears are in constant mesh, that a first speed ratio is provided, in both forward and reverse, by engaging clutch 64 so that output shaft 132 is driven through the gear trains comprising either gears 140, 62, 66 and 138 or 34, 36, 54, 52, 140, 62, 66 and 138. A second speed ratio is provided, in both forward and reverse, by engaging clutch 58 so that output shaft 132 is driven through the gear trains comprising either gears 52,54, 66 and 138 or 34, 36, 66 and 138. A third speed ratio is provided by engaging clutch 136 so that output shaft 132 is directly driven in the forward direction, via clutch 38, with no load on any gears, and in the reverse direction through the gear train comprising gears 34, 36, 54 and 52.

In view of the foregoing description, it will be apparent that a first forward speed ratio is provided by the engagement of clutch 38 and clutch 64, a second higher speed ratio is provided by continued engagement of clutch 38 and the engagement of clutch 58 instead of clutch 64, and a third speed ratio is provided by the continued engagement of clutch 38 and the engagement of clutch 136 instead of clutch 58. By engaging clutches 50 and 64, a low reverse speed ratio is provided, and by releasing clutch 64 and engaging clutch 58, a second reverse speed ratio is provided. A third, or high, reverse speed ratio is provided by engaging clutches 50 and 136.

It should be noted that in transmission 130, input shaft 14, shaft 134 and output shaft 132 are all axially aligned, as are countershafts 24 and 26. In addition, all of these shafts lie in a common vertical plane, with this arrangement giving a compact three speed in-line constant-mesh-gear transmission.

DESCRIPTION OF THE FIG. 9 MODIFICATION

Figure 9:
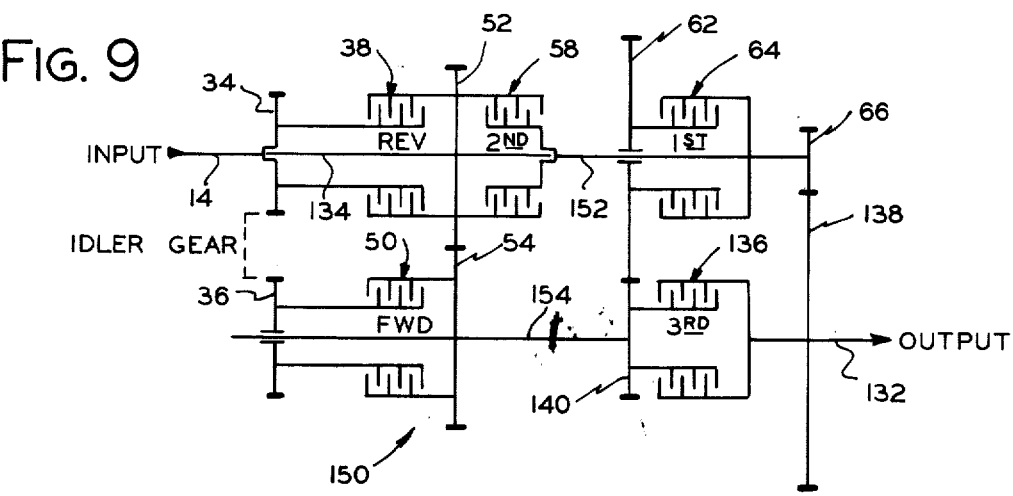
FIG. 9 is a schematic representation of a three speed short-drop version of the transmission shown in FIG. 7.

Referring now to FIG. 9, there is a schematic representation of a three speed short-drop version 150 of the transmission shown in FIGS. 7 and 8, with transmission 150 also providing three speed ratios in both the forward and reverse direction. To the extent that transmission 150 is the same as previously described transmission 130 in FIGS. 7 and 8, reference is made here to this preceding description, with like reference numerals being applied to like parts.

Reference numeral 150 generally denotes a transmission in which input shaft 14, output shaft 132, as well as shafts 134, 152 and 154 are journaled for rotation.

Connected to input shaft 14 is a gear 34 which is drivingly connected by means of an idler gear (not shown) with a gear 36, with gear 36 being journaled for rotation on shaft or countershaft 154. Gear 34 can be connected to shaft 134 for conjoint rotation therewith by means of a clutch 38, with shaft 152, which is axially aligned with shaft 134, being connectable to shaft 134 for conjoint rotation therewith by engagement of a clutch 58. Gear 36 can be connected to countershaft 154 for conjoint rotation therewith by means of a clutch 50.

At this time, it will be noted that a gear 52 is integral with the double drum of clutches 38 and 58, and meshes with a gear 54 which is integral with the drum of clutch 50. It should also be clear at this time that input shaft 14, shaft 134 and shaft 152 are in axial alignment and are also vertically aligned with, and in the same vertical plane with, shaft or countershaft 154 and output shaft 132, with countershaft 154 and output shaft 132 also being axially aligned. Shaft 134 and countershaft 154 are interconnected by means of meshing gears 52 and 54, so that for any given direction of rotation of one of these shafts, the other shaft will rotate in the opposite direction. In addition, since gear 34 is drivingly connected, via an idler gear, with gear 36, they, therefore, rotate in the same direction. Thus, engagement of clutch 38 conditions transmission 150 for what may arbitrarily be designated "reverse drive," and engagement of clutch 50 conditions the transmission for what may again be arbitrarily termed "forward drive" depending, of course, on the direction of rotation of input shaft 14.

A gear 62 is journaled for rotation on shaft 152 and can be connected thereto for conjoint rotation therewith by means of a clutch 64. In addition, another gear 66 is fixed to shaft 152 for conjoint rotation therewith, and is in constant mesh with a gear 138 affixed to output shaft 132. A further gear 140 is fixed to countershaft 154 and can be connected to output shaft 132, which is axially aligned with countershaft 154, by means of a clutch 136.

At this point, it will be seen, since all of the gears are in constant mesh, that a first speed ratio is provided, in both forward and reverse, by engaging clutch 64 so that output shaft 132 is driven through the gear trains comprising either gears 34, 36, 140, 62, 66 and 138 or 52, 54, 140, 62, 66 and 138. A second speed ratio is provided, in both forward and reverse, by engaging clutch 58 so that output shaft 132 is driven through the gear trains comprising either gears 34, 36, 54, 52, 66 and 138 or 66 and 138. A third speed ratio is provided, in both forward and reverse, by engaging clutch 136, thereby driving output shaft 132 through gear trains comprising either gears 34 and 36 or 52 and 54.

In view of the foregoing description, it will be apparent that a first, or low, forward speed ratio is provided by the engagement of clutches 50 and 64; a second, or intermediate, speed ratio is provided by the continued engagement of clutch 50 and the engagement of clutch 58 instead of clutch 64; and a third, or high, speed ratio is provided by the continued engagement of clutch 50 and the engagement of clutch 136 instead of clutch 58. By engaging clutches 38 and 64, a low reverse speed ratio is provided, and by releasing clutch 64 and engaging clutch 58, a second, or intermediate, reverse speed ratio is provided. A third, or high, reverse speed ratio is provided by engaging clutches 38 and 136.

It should again be noted that in transmission 150, all shafts lie in a common vertical plane, with this arrangement giving a compact three speed short-drop constant-mesh-gear transmission.

From the foregoing, it is believed that those familiar with the art will readily recognize and appreciate the novel concepts and features of the present invention. Obviously, while the invention has been described in relation to only a limited number of embodiments, numerous variations, changes and substitutions of equivalents will present themselves to persons skilled in the art and may be made without necessarily departing from the scope and principles of the invention. For example, while the addition of a power takeoff shaft 78, driven at torque converter output speed, is discussed with reference to transmission 10 in FIG. 1, it should be understood that such a power takeoff shaft can also readily be utilized with transmissions 80, 90, 100 and 120 shown in FIGS. 2, 3, 4, 5 and 6, respectively. In addition, while reference is made that output shaft gear 76 could be journaled so as to be selectively engageable and disengageable with output shaft 16, so as to readily permit towing without rotating any other transmission components besides the output shaft, it should be understood that this feature may be incorporated in all of the embodiments of this invention. Furthermore, front power takeoff shafts and/or co-axial auxiliary output shafts, as described with reference to transmission 10 in FIGS. 1 and 2, may also readily be used in transmissions 80 and 100 shown in FIGS. 3 and 5, respectively. As a result, the embodiments described herein are subject to various modifications, changes and the like, without departing from the scope and spirit of the invention. Consequently, the scope of this invention should be determined solely by reference to the claims appended hereto.

What is claimed is:

1. In a multispeed constant-mesh-gear transmission of the type having a plurality of shafts, gears and bidirectionally engageable clutches, the combination comprising:
   a. an input shaft;
   b. a first gear fixed to said input shaft;
   c. a first shaft lying in a common plane with and capable of bidirectional rotation with respect to said input shaft;
   d. a second gear mounted on and capable of being rotated with respect to said first shaft and drivingly connected with said first gear so as to rotate in the same direction therewith;
   e. a second shaft axially aligned with and capable of bidirectional rotation with respect to said input shaft;
   f. first clutch means for connecting said input shaft with said second shaft;
   g. second clutch means for connecting said second gear to said first shaft for conjoint rotation therewith;
   h. a third gear fixed to said second shaft;
   i. a fourth gear fixed to said first shaft and in mesh with said third gear;
   j. a third shaft axially aligned with one of said first and second shafts and capable of bidirectional rotation with respect to said input shaft;
   k. third clutch means for connecting said third shaft with one of said first and second shafts;
   l. a fifth gear mounted on and capable of being rotated with respect to said third shaft;
   m. fourth clutch means for connecting said fifth gear to said third shaft;
   n. a sixth gear fixed to said third shaft, said fifth gear being located intermediate said third clutch means and said sixth gear;
   o. an output shaft capable of bidirectional rotation with respect to said input shaft; and
   p. means for drivingly connecting said output shaft with at least said sixth gear, with all of said shafts lying in a common plane.

2. In the transmission of claim 1 wherein said connecting means includes:
   a. a fourth shaft vertically aligned with said input shaft;
   b. a seventh gear fixed to said fourth shaft and in mesh with said fourth gear;
   c. an eighth gear fixed to said fourth shaft and in mesh with said fifth gear;
   d. a fifth shaft axially aligned with said fourth shaft;
   e. fifth clutch means for connecting said fourth shaft to said fifth shaft for conjoint rotation therewith;
   f. a ninth gear fixed to said fifth shaft and in mesh with said sixth gear; and
   g. a tenth gear fixed to said output shaft and in mesh with said ninth gear, with said output shaft being vertically aligned with said input shaft and selective engagement of one of said first and second clutch means permitting alternate directional rotation of said output shaft.

3. In the transmission of claim 1 wherein said connecting means includes:
   a. a fourth shaft vertically aligned with said input shaft;
   b. a seventh gear fixed to said fourth shaft and in mesh with said fourth gear;
   c. an eighth gear fixed to said fourth shaft and in mesh with said fifth gear;
   d. a fifth shaft axially aligned with said fourth shaft;
   e. a ninth gear fixed to said fifth shaft and in mesh with said sixth gear;
   f. a tenth gear mounted on and capable of being rotated with respect to said output shaft;

g. an eleventh gear fixed to said fifth shaft and in mesh with said tenth gear;
h. a twelfth gear mounted on and capable of being rotated with respect to said output shaft;
i. a thirteenth gear fixed to said fifth shaft and in mesh with said twelfth gear; and
j. means for alternately connecting one of said tenth and twelfth gears to said output shaft for conjoint rotation therewith, with said output shaft being vertically aligned with said input shaft and selective engagement of one of said first and second clutch means permitting alternate directional rotation of said output shaft.

4. In the transmission of claim 1 wherein said connecting means includes:
   a. fourth shaft vertically aligned with said input shaft;
   b. a seventh gear fixed to said fourth shaft and in mesh with said fourth gear;
   c. an eighth gear fixed to said fourth shaft and in mesh with said fifth gear;
   d. fifth clutch means for connecting said fourth shaft to said output shaft for conjoint rotation therewith; and
   e. a ninth gear fixed to said output shaft and in mesh with said sixth gear, with said output shaft being vertically aligned with said input shaft and selective engagement of one of said first and second clutch means permitting alternate directional rotation of said output shaft.

5. In the transmission of claim 1, said combination further including a seventh gear fixed to said second shaft and in mesh with said fifth gear, and wherein said connecting means includes:
   a. a fourth shaft vertically aligned with said input shaft;
   b. an eighth gear mounted on and capable of being rotated with respect to said fourth shaft and in mesh with said fifth gear;
   c. fifth clutch means for connecting said eighth gear to said fourth shaft for conjoint rotation therewith;
   d. a ninth gear fixed to said fourth shaft and in mesh with said sixth gear; and
   e. a tenth gear fixed to said output shaft and in mesh with said ninth gear, with said output shaft being vertically aligned with said input shaft and selective engagement of one of said first and second clutch means permitting alternate directional rotation of said output shaft.

6. In the transmission of claim 1, said combination further including a seventh gear fixed to said second shaft and in mesh with said fifth gear and wherein said connecting means includes:
   a. an eighth gear mounted on and capable of being rotated with respect to said output shaft and in mesh with said fifth gear;
   b. fifth clutch means for connecting said eighth gear to said output shaft for conjoint rotation therewith; and
   c. a ninth gear fixed to said output shaft and in mesh with said sixth gear, with said output shaft being vertically aligned with said input shaft and selective engagement of one of said first and second clutch means permitting alternate directional rotation of said output shaft.

7. In the transmission of claim 1 wherein said connecting means includes:
   a. a seventh gear fixed to said output shaft and in mesh with said sixth gear;
   b. an eighth gear fixed to said second shaft and in mesh with said fifth gear; and
   c. fifth clutch means for connecting said second shaft to said output shaft for conjoint rotation therewith, with said output shaft being axially aligned with said input shaft and selective engagement of one of said first and second clutch means permitting alternate directional rotation of said output shaft.

8. In the transmission of claim 1 wherein said connecting means includes:
   a. a seventh gear fixed to said output shaft and in mesh with said sixth gear;
   b. an eighth gear fixed to said first shaft and in mesh with said fifth gear; and
   c. fifth clutch means for connecting said first shaft to said output shaft for conjoint rotation therewith, with said output shaft being vertically aligned with said input shaft and selective engagement of one of said first and second clutch means permitting alternate directional rotation of said output shaft.

9. In the transmission of claim 1, said combination further including a power takeoff shaft concentric with said second shaft and connected to said input shaft for conjoint rotation therewith.

10. In the transmission of claim 1 wherein said connecting means includes at least one gear journalled on and bidirectionally rotatable with said output shaft, said connecting means further including means for selectively connecting and disconnecting said at least one gear with respect to said output shaft.

11. In a multispeed constant-mesh-gear transmission of the type having a plurality of drivingly interconnected gears, shafts and clutches, the combination comprising:
   a. an input shaft;
   b. a first gear fixed to said input shaft;
   c. a first countershaft vertically aligned with and bidirectionally rotatable with respect to said input shaft;
   d. a second gear mounted on and capable of being rotated with respect to said first countershaft and drivingly connected with said first gear so as to rotate in the same direction therewith;
   e. a first shaft axially aligned with and bidirectionally rotatable with respect to said input shaft;
   f. first clutch means for connecting said input shaft to said axially aligned first shaft for conjoint rotation therewith;
   g. second clutch means for connecting said second gear to said first countershaft for conjoint rotation therewith;
   h. a third gear fixed to said axially aligned first shaft;
   i. a fourth gear fixed to said first countershaft and in mesh with said third gear;
   j. a second countershaft axially aligned with said first countershaft and bidirectionally rotatable with respect to said input shaft;
   k. third clutch means for connecting said first countershaft to said second countershaft for conjoint rotation therewith;
   l. a fifth gear mounted on and capable of being rotated with respect to said second countershaft;
   m. bidirectionally engageable fourth clutch means for connecting said fifth gear to said second countershaft for conjoint rotation therewith;

n. a sixth gear fixed to said second countershaft said fifth gear being located intermediate said third clutch means and said sixth gear;

o. an output shaft vertically aligned with said countershafts and bidirectionally rotatable with respect to said input shaft; and p. means for drivingly connecting said output shaft with at least said sixth gear.

12. In the transmission of claim 11 wherein said connecting means includes:

a. a second shaft vertically aligned with said input shaft;

b. a seventh gear fixed to said second shaft and in mesh with said fourth gear;

c. an eighth gear fixed to said second shaft and in mesh with said fifth gear;

d. a third shaft axially aligned with said second shaft;

e. bidirectionally engageable fifth clutch means for connecting said second shaft to said third shaft for conjoint rotation therewith;

f. a ninth gear fixed to said third shaft and in mesh with said sixth gear; and g. a tenth gear fixed to said output shaft and in mesh with said ninth gear, with said output shaft being vertically aligned with said input shaft.

13. In the transmission of claim 11 wherein said connecting means includes:

a. a second shaft vertically aligned with said input shaft;

b. a seventh gear fixed to said second shaft and in mesh with said fourth gear;

c. an eighth gear fixed to said second shaft and in mesh with said fifth gear;

d. a third shaft axially aligned with said second shaft;

e. a ninth gear fixed to said third shaft and in mesh with said sixth gear;

f. a tenth gear mounted on and capable of being rotated with respect to said output shaft;

g. an eleventh gear fixed to said third shaft and in mesh with said tenth gear;

h. a twelfth gear mounted on and capable of being rotated with respect to said output shaft;

i. a thirteenth gear fixed to said third shaft and in mesh with said twelfth gear; and j. means for alternately connecting one of said tenth and twelfth gears to said output shaft for conjoint rotation therewith, with said output shaft being vertically aligned with said input shaft.

14. In the transmission of claim 11 wherein said connecting means includes:

a. a second shaft vertically aligned with said input shaft;

b. a seventh gear fixed to said second shaft and in mesh with said fourth gear;

c. an eighth gear fixed to said second shaft and in mesh with said fifth gear;

d. bidirectionally engageable fifth clutch means for connecting said second shaft to said output shaft for conjoint rotation therewith; and e. a ninth gear fixed to said output shaft and in mesh with said sixth gear, with said output shaft being vertically aligned with said input shaft.

15. In the transmission of claim 11, said combination further including a seventh gear fixed to said first shaft and in mesh with said fifth gear, and wherein said connecting means includes:

a. a second shaft vertically aligned with said input shaft;

b. an eighth gear mounted on and capable of being rotated with respect to said second shaft and in mesh with said fifth gear;

c. bidirectionally engageable fifth clutch means for connecting said eighth gear to said second shaft for conjoint rotation therewith;

d. a ninth gear fixed to said second shaft and in mesh with said sixth gear; and e. a tenth gear fixed to said output shaft and in mesh with said ninth gear, with said output shaft being vertically aligned with said input shaft.

16. In the transmission of claim 11, said combination further including a seventh gear fixed to said first shaft and in mesh with said fifth gear and wherein said connecting means includes:

a. an eighth gear mounted on and capable of being rotated with respect to said output shaft and in mesh with said fifth gear;

b. bidirectionally engageable fifth clutch means for connecting said eighth gear to said output shaft for conjoint rotation therewith; and c. a ninth gear fixed to said output shaft and in mesh with said sixth gear, with said output shaft being vertically aligned with said input shaft.

17. In the transmission of claim 11 wherein said connecting means includes:

a. a seventh gear fixed to said output shaft and in mesh with said sixth gear;

b. an eighth gear fixed to said first shaft and in mesh with said fifth gear; and c. bidirectionally engageable fifth clutch means for connecting said first shaft to said output shaft for conjoint rotation therewith, with said output shaft being axially aligned with said input shaft.

18. A multispeed constant-mesh-gear reversible transmission comprising:

a. an input shaft;

b. a first gear fixed to said input shaft;

c. a first countershaft vertically aligned with and capable of bidirectional rotation with respect to said input shaft;

d. a second gear mounted on and capable of being rotated with respect to said first countershaft and drivingly connected with said first gear for similar unidirectional rotation therewith;

e. a shaft axially aligned with and bidirectionally rotatable with respect to said input shaft;

f. first clutch means for connecting said input shaft to said axially aligned shaft for conjoint rotation therewith;

g. second clutch means for connecting said second gear to said first countershaft for conjoint rotation therewith;

h. a third gear fixed to said axially aligned shaft;

i. a fourth gear fixed to said first countershaft and in mesh with said third gear;

j. a second countershaft axially aligned with said first countershaft and bidirectionally rotatable with respect to said input shaft;

k. third clutch means for connecting said first countershaft to said second countershaft for conjoint rotation therewith;

l. a fifth gear mounted on and capable of being bidirectionally rotated with respect to said second countershaft;

m. fourth clutch means for connecting said fifth gear to said second countershaft for conjoint rotation therewith;

n. a sixth gear fixed to said second countershaft, said fifth gear being located intermediate said third clutch means and said sixth gear;

o. an output shaft capable of bidirectional rotation with respect to said input shaft, with the engagement of one and the disengagement of the other one of said first and second clutch means permitting alternate directional rotation of said output shaft; and p. means including fifth clutch means for drivingly connecting said output shaft with at least said sixth gear, with all of said shafts and countershafts lying in a common vertical plane.

19. A multispeed constant-mesh-gear reversible transmission comprising:

a. an input shaft;
b. a first gear fixed to said input shaft;
c. a countershaft vertically aligned with and capable of bidirectional rotation with respect to said input shaft;
d. a second gear mounted on and capable of being rotated with respect to said countershaft and in mesh with said first gear so as to rotate in the same direction therewith;
e. a first shaft axially aligned with and capable of bidirectional rotation with respect to said input shaft;
f. first clutch means for connecting said input shaft to said first shaft for conjoint rotation therewith;
g. second clutch means for connecting said second gear to said countershaft for conjoint rotation therewith;
h. a third gear fixed to said first shaft;
i. a fourth gear fixed to said countershaft and in mesh with said third gear;
j. a second shaft axially aligned with and capable of bidirectional rotation with respect to said first shaft;
k. third clutch means for connecting said first shaft to said second shaft for conjoint rotation therewith;
l. a fifth gear mounted on and capable of being rotated with respect to said second shaft;
m. fourth clutch means for connecting said fifth gear to said second shaft for conjoint rotation therewith;
n. a sixth gear fixed to said second shaft, said fifth gear being located intermediate said third clutch means and said sixth gear;
o. an output shaft vertically aligned with and capable of bidirectional rotation with respect to said input shaft;
p. a seventh gear fixed to said output shaft and in mesh with said sixth gear;
q. an eighth gear fixed to said countershaft and in mesh with said fifth gear; and
r. fifth clutch means for connecting said countershaft to said output shaft for conjoint rotation therewith.

20. A multispeed constant-mesh-gear reversible transmission comprising:

a. an input shaft;
b. a first gear fixed to said input shaft;
c. a first countershaft vertically aligned with and bidirectionally rotatable with respect to said input shaft;
d. a second gear mounted on and capable of being rotated with respect to said first countershaft and drivingly connected with said first gear so as to rotate in same direction therewith;
e. a first shaft axially aligned with and capable of bidirectional rotation with respect to said input shaft;
f. first clutch means for connecting said input shaft to said axially aligned first shaft for conjoint rotation therewith;
g. second clutch means for connecting said second gear to said first countershaft for conjoint rotation therewith;
h. a third gear fixed to said axially aligned first shaft;
i. a fourth gear fixed to said first countershaft and in mesh with said third gear;
j. a second countershaft axially aligned with said first countershaft and bidirectionally rotatable with respect to said input shaft;
k. third clutch means for connecting said first countershaft to said second countershaft for conjoint rotation therewith;
l. a fifth gear mounted on and capable of being rotated with respect to said second countershaft;
m. fourth clutch means for connecting said fifth gear to said second countershaft for conjoint rotation therewith;
n. a sixth gear fixed to said second countershaft, said fifth gear being located intermediate said third clutch means and said sixth gear;
o. a second shaft vertically aligned with said countershafts and capable of bidirectional rotation with respect to said input shaft;
p. a seventh gear fixed to one of said first and second shafts and in mesh with one of said fourth and fifth gears;
q. an output shaft vertically aligned with said countershafts, and bidirectionally rotatable with respect to said input shaft;
r. a gear fixed to said output shaft; and
s. means including fifth clutch means for drivingly connecting said output shaft gear with said sixth gear.

21. The transmission of claim 20 wherein said connecting means includes:

a. an eighth gear fixed to said second shaft and in mesh with said fifth gear;
b. a third shaft axially aligned with said second shaft and bidirectionally rotatable with respect to said input shaft; and
c. a ninth gear fixed to said third shaft and in mesh with said sixth and output-shaft gears, with said fifth clutch means connecting said second and third shafts for conjoint rotation.

22. The transmission of claim 20 wherein said connecting means includes:

a. an eighth gear mounted on and capable of being rotated with respect to said second shaft and in mesh with said fifth gear; and
b. a ninth gear fixed to said second shaft and in mesh with said sixth and output-shaft gears, with said fifth clutch means connecting said eighth gear to said second shaft for conjoint rotation therewith.

23. A multispeed constant-mesh-gear transmission comprising:

a. an input shaft;
b. a first gear fixed to said input shaft;
c. a first shaft lying in a common plane with and capable of bidirectional rotation with respect to said input shaft;

d. a second gear mounted on and capable of being rotated with respect to said first shaft and drivingly connected with said first gear for parallel rotation therewith;
e. a second shaft axially aligned with and bidirectionally rotatable with respect to said input shaft;
f. first clutch means for connecting said input shaft with said second shaft;
g. second clutch means for connecting said second gear to said first shaft for conjoint rotation therewith;
h. a third gear fixed to said second shaft;
i. a fourth gear fixed to said first shaft and in mesh with said third gear;
j. a third shaft axially aligned with one of said first and second shafts and capable of bidirectional rotation with respect to said input shaft;
k. third clutch means for connecting said third shaft with one of said first and second shafts;
l. a fifth gear mounted on and capable of being bidirectionally rotated with respect to said third shaft;
m. fourth clutch means for connecting said fifth gear to said third shaft;
n. a sixth gear fixed to said third shaft, said fifth gear being located intermediate said third clutch means and said sixth gear;
o. an output shaft capable of bidirectional rotation with respect to said input shaft;
p. a seventh gear fixed to said output shaft and in mesh with said sixth gear;
q. an eighth gear fixed to one of said first and second shafts and in mesh with said fifth gear; and
r. fifth clutch means for connecting one of said first and second shafts to said output shaft for conjoint rotation therewith, with all of said shafts lying in a common vertical plane with all of said clutch means being bidirectionally engageable and only one of said first and second clutch means as well as only one of said third, fourth and fifth clutch means being simultaneously engaged to provide rotation of said output shaft.

24. A dual range multispeed constant-mesh-gear reversible transmission comprising:
a. an input shaft;
b. a first gear fixed to said input shaft;
c. a first countershaft vertically aligned with and bidirectionally rotatable with respect to said input shaft;
d. a second gear mounted on and capable of being rotated with respect to said first countershaft and drivingly connected with said first gear so as to rotate in the same direction therewith;
e. a first shaft axially aligned with said input shaft;
f. first clutch means for connecting said input shaft to said axially aligned first shaft for conjoint rotation therewith;
g. second clutch means for connecting said second gear to said first countershaft for conjoint rotation therewith;
h. a third gear fixed to said axially aligned first shaft;
i. a fourth gear fixed to said first countershaft and in mesh with said third gear;
j. a second countershaft axially aligned with said first countershaft and bidirectionally rotatable with respect to said input shaft;
k. third clutch means for connecting said first countershaft to said second countershaft for conjoint rotation therewith;
l. a fifth gear mounted on and capable of being rotated with respect to said second countershaft;
m. fourth clutch means for connecting said fifth gear to said second countershaft for conjoint rotation therewith;
n. a sixth gear fixed to said second countershaft, said fifth gear being located intermediate said third clutch means and said fixth gear;
o. an output shaft vertically aligned with said countershafts and capable of bidirectional rotation with respect to said input shaft;
p. a second shaft vertically aligned with and bidirectionally rotatable with respect to said input shaft;
q. a seventh gear fixed to said second shaft and in mesh with said fourth gear;
r. an eighth gear fixed to said second shaft and in mesh with said fifth gear;
s. a third shaft axially aligned with said second shaft and bidirectionally rotatable with respect to said input shaft;
t. a ninth gear fixed to said third shaft and in mesh with said sixth gear;
u. a tenth gear mounted on and capable of being rotated with respect to said output shaft;
v. an eleventh gear fixed to said third shaft and in mesh with said tenth gear;
w. a twelfth gear mounted on and capable of being rotated with respect to said output shaft;
x. a thirteenth gear fixed to said third shaft and in mesh with said twelfth gear; and
y. means for alternately connecting one of said tenth and twelfth gears to said output shaft for conjoint rotation therewith; thereby permitting rotation of said output shaft through one of the gear trains comprising gears ten and eleven as well as gears twelve and thirteen, respectively.

* * * * *

UNITED STATES PATENT OFFICE
CERTIFICATE OF CORRECTION

PATENT NO. : 3,893,345
DATED : July 8, 1975
INVENTOR(S) : Ronald L. Sisson, Philip J. Dreves, James E. Shellberg and Burton S. Zeller It is certified that error appears in the above-identified patent and that said Letters Patent are hereby corrected as shown below:

Column 1, line 21, delete "paramont" and insert --paramount--.

Column 3, line 62, after "mounted" insert --on--.

Column 3, line 63, delete "on".

Column 6, line 49, delete "75" and insert --76--.

Column 6, line 61, delete "80" and insert --70--.

Column 7, line 35, after "62" insert --66,--.

Column 13, line 16, before "fourth shaft" insert --a--.

Column 15, line 1, after "countershaft" insert --,--.

Column 16, line 41, delete "firat" and insert --first--.

Column 20, line 23, delete "fixth" and insert --sixth--.

Signed and Sealed this seventh Day of October 1975

[SEAL]

Attest:

RUTH C. MASON
Attesting Officer

C. MARSHALL DANN
Commissioner of Patents and Trademarks